United States Patent
Stratton

(10) Patent No.: US 12,366,211 B2
(45) Date of Patent: Jul. 22, 2025

(54) AIRCRAFT CONTRAIL MONITORING AND TARGETED MITIGATION

(71) Applicant: Pratt & Whitney Canada Corp., Longueuil (CA)

(72) Inventor: Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 172 days.

(21) Appl. No.: 17/978,621

(22) Filed: Nov. 1, 2022

(65) Prior Publication Data

US 2024/0052791 A1 Feb. 15, 2024

Related U.S. Application Data

(60) Provisional application No. 63/396,418, filed on Aug. 9, 2022.

(51) Int. Cl.
| | | |
|---|---|---|
| *F02C 9/28* | (2006.01) | |
| *G01W 1/08* | (2006.01) | |
| *B64D 45/00* | (2006.01) | |

(52) U.S. Cl.
CPC ............... *F02C 9/28* (2013.01); *G01W 1/08* (2013.01); *B64D 2045/0085* (2013.01); *F05D 2220/323* (2013.01); *F05D 2270/083* (2013.01); *F05D 2270/303* (2013.01); *F05D 2270/306* (2013.01)

(58) Field of Classification Search
CPC ........................................................ F02C 9/28
See application file for complete search history.

(56) References Cited

U.S. PATENT DOCUMENTS

| | | | |
|---|---|---|---|
| 9,002,660 B2 * | 4/2015 | Mannstein | B64D 45/00 702/30 |
| 9,309,811 B2 | 4/2016 | Swann | |
| 9,518,965 B2 | 12/2016 | Swann | |
| 9,896,218 B2 | 2/2018 | Swann | |
| 10,259,590 B2 | 4/2019 | Swann | |
| 10,371,003 B2 | 8/2019 | Swann | |
| 2015/0100220 A1 * | 4/2015 | Swann | F02C 9/28 701/100 |

(Continued)

FOREIGN PATENT DOCUMENTS

WO 2022079599 A1 4/2022

OTHER PUBLICATIONS

EP Search Report for EP Patent Application No. 23190407.9 dated Jan. 2, 2024.

*Primary Examiner* — Katheryn A Malatek
(74) *Attorney, Agent, or Firm* — Getz Balich LLC

(57) ABSTRACT

A system is provided for an aircraft. This aircraft system includes an aircraft powerplant, a powerplant sensor system, an environment sensor system and a monitoring system. The aircraft powerplant includes a heat engine. The powerplant sensor system is configured to provide engine data indicative of one or more operating parameters of the heat engine. The environment sensor system is configured to provide environment data indicative of one or more environmental parameters of an environment in which the heat engine is operating. The monitoring system is configured to determine formation of a contrail and quantify an impact of the contrail when formed based on the engine data and the environment data.

18 Claims, 3 Drawing Sheets

(56) References Cited

U.S. PATENT DOCUMENTS

| | | | |
|---|---|---|---|
| 2015/0284102 A1* | 10/2015 | Swann | B64D 33/04 |
| | | | 701/3 |
| 2015/0284103 A1 | 10/2015 | Swann | |
| 2015/0285158 A1 | 10/2015 | Hillel | |
| 2016/0304211 A1 | 10/2016 | Swann | |
| 2016/0376918 A1* | 12/2016 | Swann | F01D 15/10 |
| | | | 60/772 |
| 2021/0277839 A1* | 9/2021 | Madden | F02C 9/28 |

* cited by examiner

AIRCRAFT CONTRAIL MONITORING AND TARGETED MITIGATION

This application claims priority to U.S. Provisional Patent Application No. 63/396,418 filed Aug. 9, 2022, which is hereby incorporated herein by reference in its entirety.

TECHNICAL FIELD

This disclosure relates generally to an aircraft and, more particularly, to aircraft contrail monitoring and mitigation.

BACKGROUND INFORMATION

An aircraft contrail may form under certain environmental conditions when combustion product from an aircraft propulsion system are exhausted into ambient air. Various techniques are known in the art for predicting formation of an aircraft contrail and for mitigating formation of an aircraft contrail. While these known contrail prediction and mitigation techniques have various benefits, there is still room in the art for improvement.

SUMMARY

According to an aspect of the present disclosure, a system is provided for an aircraft. This aircraft system includes an aircraft powerplant, a powerplant sensor system, an environment sensor system and a monitoring system. The aircraft powerplant includes a heat engine. The powerplant sensor system is configured to provide engine data indicative of one or more operating parameters of the heat engine. The environment sensor system is configured to provide environment data indicative of one or more environmental parameters of an environment in which the heat engine is operating. The monitoring system is configured to determine formation of a contrail and quantify an impact of the contrail when formed based on the engine data and the environment data.

According to another aspect of the present disclosure, another system is provided for an aircraft. This aircraft system includes an aircraft powerplant, a monitoring system and a user interface. The aircraft powerplant includes a heat engine. The monitoring system is configured to predict formation of a contrail in an environment and quantify an impact of the contrail based on real-time operating parameters of the heat engine and real-time environmental parameters of the environment. The user interface is configured to notify an operator of the aircraft powerplant when the quantified impact of the contrail is greater than a threshold for at least a predetermined duration.

According to still another aspect of the present disclosure, a method is provided for operating an aircraft. During this method, engine data is provided indicative of one or more operating parameters of a heat engine. Environment data is provided indicative of one or more environmental parameters of an environment through which the aircraft is flying. Formation of a contrail within the environment is determined and an impact of the contrail is quantified based on the engine data and the environment data.

The method may also include initiating a response when the impact of the contrail is greater than a threshold for greater than a predetermined duration.

The monitoring system may be configured to determine the formation of the contrail and/or quantify the impact of the contrail when formed further based on a chemical properties of fuel provided to the heat engine.

The monitoring system may be configured to quantify the impact of the contrail based on predicted persistence of the contrail within the environment.

The one or more operating parameters may include an exhaust temperature of the heat engine.

The one or more operating parameters may include a fuel flow rate to one or more injectors of the heat engine.

The one or more operating parameters may include an exhaust mass flow of the heat engine.

The one or more operating parameters may include non-volatile particulate matter emissions from the heat engine.

The one or more environmental parameters may include radiation within the environment. The monitoring system may be configured to quantify the impact of the contrail when formed based on an effect of the contrail on the radiation within the environment.

The radiation within the environment may include radiation traveling within the environment towards earth. The radiation within the environment may also or alternatively include radiation traveling within the environment away from earth.

The one or more environmental parameters may include an optical depth of cloud cover below the aircraft powerplant and/or the aircraft. The one or more environmental parameters may also or alternatively include an optical depth of cloud cover above the aircraft powerplant and/or the aircraft.

The monitoring system may be configured to determine incremental radiative forcing associated with the contrail based on the optical depth of the cloud cover below the aircraft powerplant and/or the optical depth of the cloud cover above the aircraft powerplant.

The environment sensor system may include an optical sensor configured to measure: an intensity of radiation within the environment; and/or a wavelength distribution of the radiation within the environment.

The environment sensor system may include a plurality of optical sensors. A first of the optical sensors may be facing upwards. A second of the optical sensors may be facing downwards.

The monitoring system may be configured to: discretize the contrail into a plurality of sections; and quantify the net impact over a determined lifetime of a first of the sections of the contrail based on the engine data and the environment data.

The system may also include a user interface configured to provide a notification to an operator of the aircraft powerplant when a sequential set of the sections of the contrail are quantified to have more than a threshold impact.

The one or more environmental parameters may include any one or more or all of the following: ambient temperature within the environment; ambient pressure within the environment; humidity within the environment; wind speed within the environment; wind direction within the environment; intensity of radiation within the environment; and/or a wavelength distribution of the radiation within the environment.

The heat engine may be configured as or otherwise include a gas turbine engine.

The monitoring system may also be configured to initiate a response when the impact of the contrail is greater than a threshold for greater than a predetermined duration.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
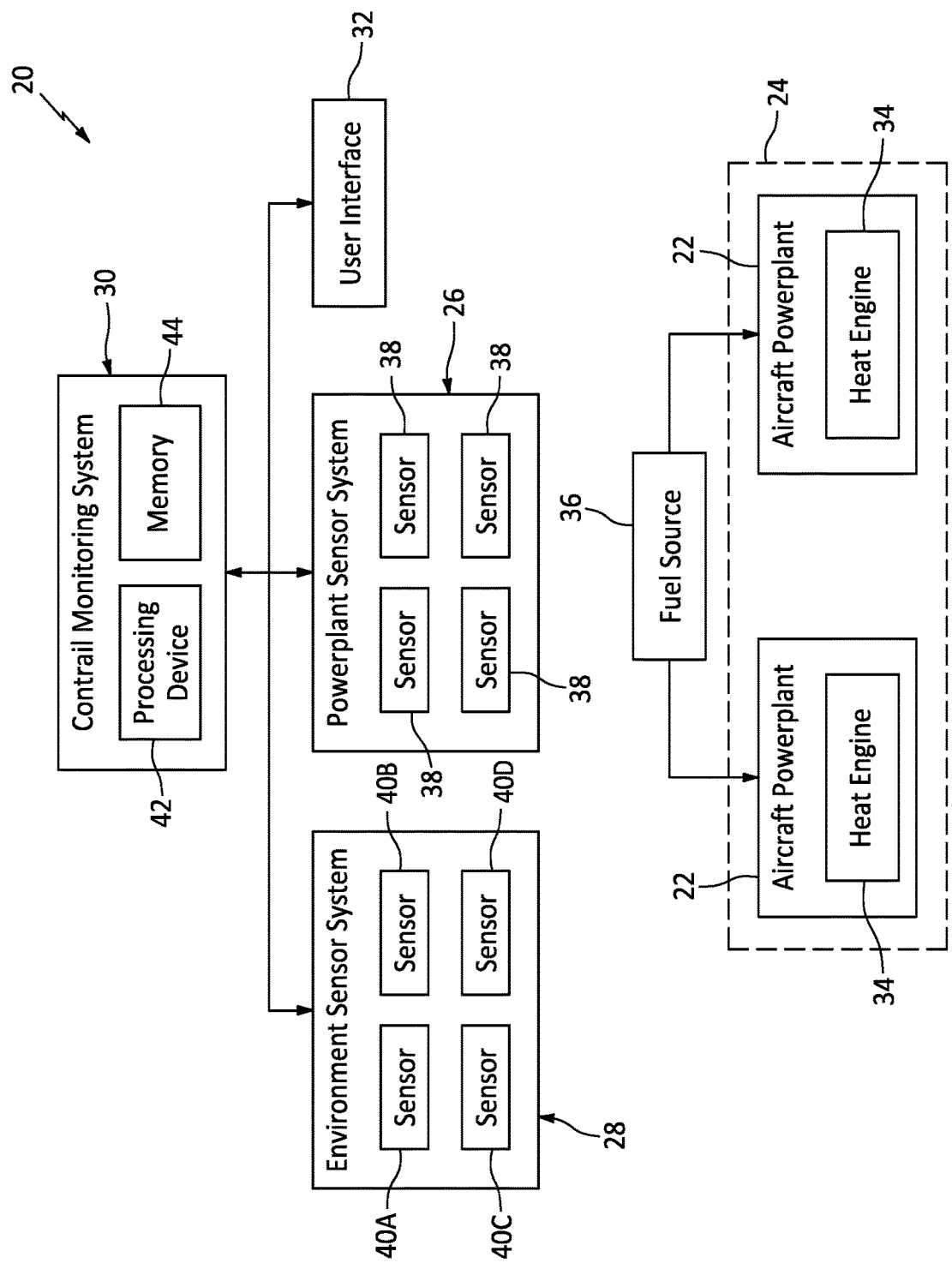
FIG. 1 is a schematic illustration of an aircraft system with a contrail monitoring system.

An aircraft contrail may form when combustion products are exhausted into an ambient environment outside of an aircraft, and the exhausted combustion products locally exceed a water saturation limit of ambient air within the outside environment while mixing and cooling to ambient conditions. Such aircraft contrail formation may contribute to climate change. An aircraft contrail, for example, may trap outgoing radiation from earth and reflect incoming radiation from the sun. On a global basis, aircraft contrails are generally considered to have a net warming impact. Aircraft contrails on average, in particular, typically trap more radiation than they reflect; however, this may vary from aircraft contrail to aircraft contrail on an individual basis.

Aircraft contrails may be mitigated using various techniques such as, but not limited to, use of contrail suppression systems and/or adjusting aircraft flight paths away from certain geographic regions with contrail forming atmospheric conditions. These contrail mitigation techniques, however, may decrease fuel efficiency of the aircraft and/or lead to increased carbon-dioxide ($CO_2$) emissions. For example, a contrail suppression system may use a condenser to remove water vapor from the combustion products prior to exhausting the combustion products into the outside environment. The removed water vapor may then be collected in an onboard tank. Use of such a condenser, however, may cause an engine pressure loss and collecting the water vapor onboard the aircraft increases aircraft weight. An adjustment may also or alternatively be made to the aircraft flight path to, for example, increase or decrease cruise altitude by a few thousand feet. Such a change in cruise altitude may require additional time at higher power engine operation for climbing to the higher altitude, or additional flight time through denser air at the lower altitude. Therefore, any reduction in climate warming associated with reducing contrail formation should be balanced with any increase in climate warming associated with decreased fuel efficiency and/or increased production of carbon-dioxide ($CO_2$) emissions.

In addition to the foregoing, some research has shown that a relatively small twenty to thirty-five percent (20-35%) of aircraft flights globally produce aircraft contrails. Some research has also shown that an even smaller five to fifteen percent (5-15%) of flights account ninety percent (90%) of climate warming from aircraft contrails. With this in mind, implementing generalized and/or fleetwide contrail mitigation based on general metrological forecasts and the like may not be effective for reducing climate warming.

An environmental impact of an aircraft contrail may be characterized by various parameters such as, but not limited to: persistence of the aircraft contrail (e.g., a duration of how long the aircraft contrail lasts following dissipation, dispersion and sedimentation); optical thickness of the aircraft contrail (e.g., transparency of the aircraft contrail to radiation); localized balance of outgoing and incoming radiation (e.g., day versus night, above or below cloud cover, etc.); and/or aircraft contrail coverage area (e.g., combustion products plume size). The present disclosure includes systems and methods for monitoring and/or mitigating one or more aircraft contrails utilizing one or more of the foregoing contrail parameters. By considering such contrail parameters, the systems and the methods of the present disclosure may also selectively implement (or suggest) aircraft contrail mitigation.

FIG. 1 illustrates a system 20 for an aircraft such as, but not limited to, an airplane. This aircraft system 20 includes one or more aircraft powerplants 22, where one or more of the aircraft powerplants 22 may be part of a propulsion system 24 for the aircraft. The aircraft system 20 also includes a powerplant sensor system 26, an aircraft environment sensor system 28 and a contrail monitoring system 30. The aircraft system 20 may still also include a user interface 32 for communicating information provided by the monitoring system 30 to personnel (e.g., a user such as a pilot) operating the aircraft and its aircraft powerplants 22.

Each aircraft powerplant 22 includes a heat engine 34, which may sometimes also be referred to as a thermal engine. The heat engine 34 may be a gas turbine engine such as, but not limited to, a turbofan engine, a turbojet engine, a turboshaft engine or a turboprop engine. The heat engine 34, however, may alternatively be another type of internal combustion (IC) engine such as, but not limited to, a reciprocating piston engine or a rotary engine.

The aircraft powerplant 22 and its heat engine 34 are configured to receive fuel from a fuel source 36; e.g., a fuel reservoir. The aircraft powerplant 22 and its heat engine 34 are configured to convert chemical energy stored within the fuel into mechanical work by combusting a mixture of the fuel and (e.g., compressed) air within at least (or only) one combustion zone (e.g., a combustion chamber) of the heat engine 34. The aircraft powerplant 22 and its heat engine 34 are configured to exhaust combustion products (e.g., exhaust) generated by the combustion of the fuel air mixture into the outside environment, which combustion products may form an aircraft contrail in the outside environment under certain environmental conditions.

The powerplant sensor system 26 is configured to measure, compute, model, synthesize and/or otherwise determine one or more (e.g., real time) operating parameters of each heat engine 34. The powerplant sensor system 26 may determine these powerplant operating parameters by measuring the operating parameters using one or more powerplant sensors 38. The powerplant sensor system 26 may also or alternatively determine one or more of the powerplant operating parameters by measuring one or more other parameters (or other measured powerplant operating parameters) and then processing those measured parameters (or other measured powerplant operating parameters) to calculate the respective powerplant operating parameter(s). Examples of the powerplant operating parameters include, but are not limited to: an exhaust temperature of the respective heat engine 34; a fuel flow rate to one or more fuel injectors of the respective heat engine 34; an exhaust flow rate out of the respective heat engine 34; a core mass flow within the respective heat engine 34; an exhaust mass flow of the respective heat engine 34; and non-volatile particulate emissions from the respective heat engine 34. Examples of the other parameters include, but are not limited to: gas pressure within the respective heat engine 34; rotating speed of a rotating element (e.g., a shaft, a rotor, etc.) within the respective heat engine 34, and gas temperature within the respective heat engine 34.

In some embodiments, the powerplant sensor system 26 may functionally include (or be in communication with) a controller for the aircraft powerplant 22 and its heat engine 34; e.g., a FADEC, an ECC, an ECU, etc. With such an arrangement, powerplant operational parameters such as the exhaust temperature, the fuel flow rate and/or the core mass flow may be taken (e.g., directly) from the powerplant controller. Other powerplant operational parameters such as the exhaust flow rate, flow conditions and/or the non-volatile particulate emissions may be synthesized or otherwise determined using a heat engine performance model. The non-volatile particulate emissions, in particular, may also be determined based on information input regarding specific chemical properties (e.g., chemical makeup) of the fuel. This may improve method performance since sustainable aviation fuels are provided with varying blend fractions at different airports that may, for example, fluctuate and generally increase over time. Sustainable aviation fuels may have a higher specific energy and/or hydrogen content than a typical fossil kerosene aviation fuel. Sustainable aviation fuels may also contain very little (e.g., trace quantities) or no (zero) sulfur, which sulfur may form a sulfuric acid coating on soot particles in the exhaust. Such a sulfuric acid coating may increase likelihood of soot particle activation into ice particles.

The environment sensor system 28 is configured to measure, compute, model, synthesize and/or otherwise determine one or more (e.g., real time) environmental parameters of the outside environment through which the aircraft is flying/within which each aircraft powerplant 22 and its heat engine 34 are operating. The environment sensor system 28 may determine these environmental parameters by measuring the environmental parameters using one or more environment sensors 40 (e.g., 40A-D). The environment sensor system 28 may also or alternatively determine one or more of the environmental parameters by measuring one or more other parameters (or other measured environmental parameters) and then processing those measured parameters (or other measured environmental parameters) to calculate the respective environmental parameter(s). Examples of the environmental parameters include, but are not limited to: ambient temperature within the outside environment; ambient pressure within the outside environment; humidity within the outside environment; wind speed within the outside environment; wind direction within the outside environment; intensity of radiation within the outside environment; and a wavelength distribution of the radiation within the outside environment. Of course, the environment sensor system 28 may also or alternatively determine one or more of the environmental parameters using forecast data received from offboard the aircraft in select embodiments.

Figure 2:
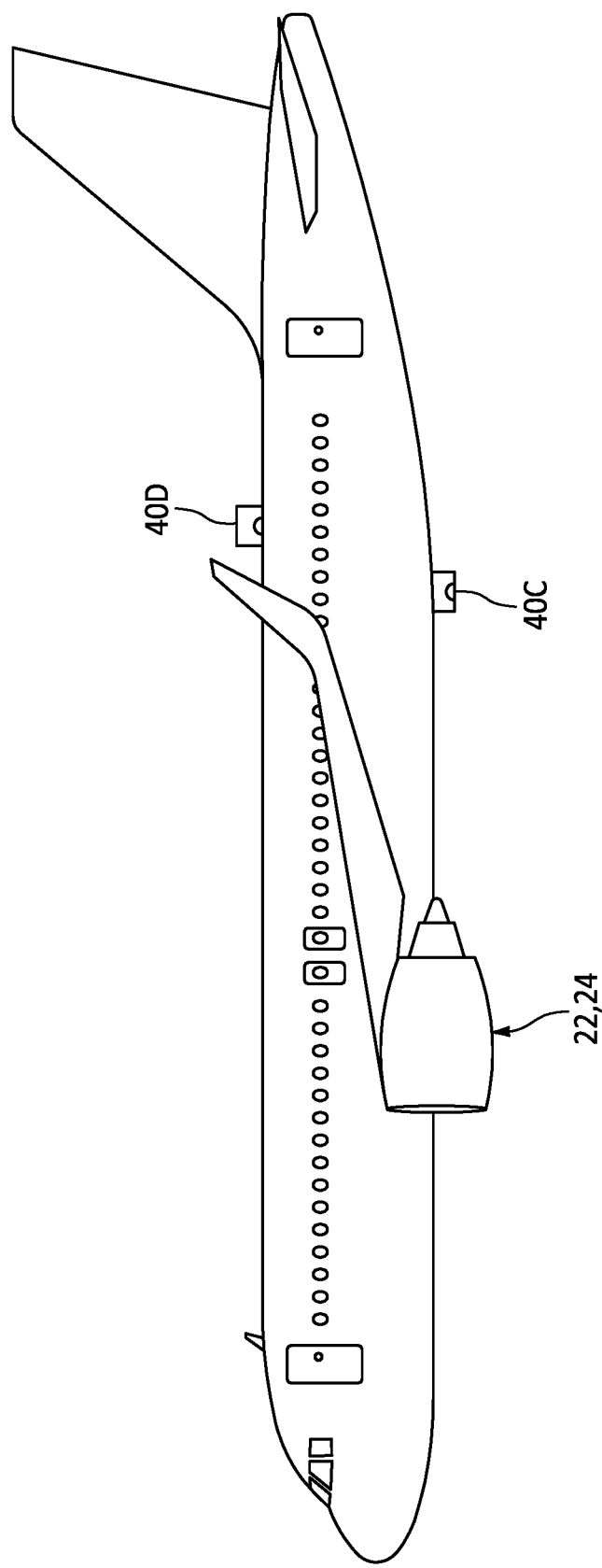
FIG. 2 is a side illustration of an aircraft configured with optical environmental sensors.

Referring to FIG. 2, each of the environment sensors 40C and 40D may be configured as an optical sensor. The downward facing environment sensor 40C is arranged to face towards the ground. This downward facing environment sensor 40C may be used for determining the intensity of and/or the wavelength distribution of the radiation traveling through the outside environment away from the earth, and towards the aircraft from earth. The downward facing environment sensor 40C may thereby provide information about outgoing radiation which may be reflected by the aircraft contrail (if formed) back to earth with a warming effect on the climate. The downward facing environment sensor 40C may also or alternatively be used to determine an optical depth of any cloud cover below the aircraft. The upward facing environment sensor 40D is arranged to face away from the ground; e.g., towards space. This upward facing environment sensor 40D may be used for determining the intensity of and/or the wavelength distribution of the radiation traveling through the outside environment towards the earth, and towards the aircraft from space. The upward facing environment sensor 40D may thereby provide information about incoming radiation which may be reflected by the aircraft contrail (if formed) away from earth back into space with a cooling effect on the climate. The upward facing environment sensor 40D may also or alternatively be used to determine an optical depth of any cloud cover above the aircraft. The optical depth of existing cloud cover above and/or below the aircraft may be used to calculate an incremental radiative forcing associated with a contrail at that location. The term "radiative forcing" may describe an energy flux between an amount of energy that enters Earth's atmosphere and an amount of energy that leaves Earth's atmosphere.

Referring to FIG. 1, the monitoring system 30 is configured to determine (e.g., predict) formation of the aircraft contrail and quantify an environmental impact of the aircraft contrail based on powerplant data (e.g., engine data) received from the powerplant sensor system 26 and environment data received from the environment sensor system 28. The powerplant data is indicative of the one or more powerplant operational parameters. The environment data is indicative of the one or more environmental parameters. The monitoring system 30 is further configured to initiate an action (e.g., providing a notification signal to the user interface 32) where the quantified impact of the aircraft contrail is greater than a (e.g., predetermined) threshold, for example, for greater than a (e.g., predetermined) duration.

The monitoring system 30 of FIG. 1 is in signal communication (e.g., hardwired and/or wirelessly coupled) with the powerplant sensor system 26, the environment sensor system 28 and the user interface 32. The monitoring system 30 may be implemented with a combination of hardware and software. The hardware may include at least one processing device 42 and a memory 44, which processing device 42 may include one or more single-core and/or multi-core processors. The hardware may also or alternatively include analog and/or digital circuitry other than that described above.

The memory 44 is configured to store software (e.g., program instructions) for execution by the processing device 42, which software execution may control and/or facilitate performance of one or more operations such as those described in the methods below. The memory 44 may be a non-transitory computer readable medium. For example, the memory 44 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The user interface 32 is configured to communicate (e.g., visually display) information provided via the notification signal to the personnel operating the aircraft and its aircraft powerplants 22. The user interface 32, for example, may be configured as or otherwise include a display screen, an indicator light and/or a gauge. The user interface 32 may also or alternatively be configured as or otherwise include an electro-acoustic transducer for audibly presenting the information. The present disclosure, however, is not limited to the foregoing exemplary user interfaces.

Figure 3:
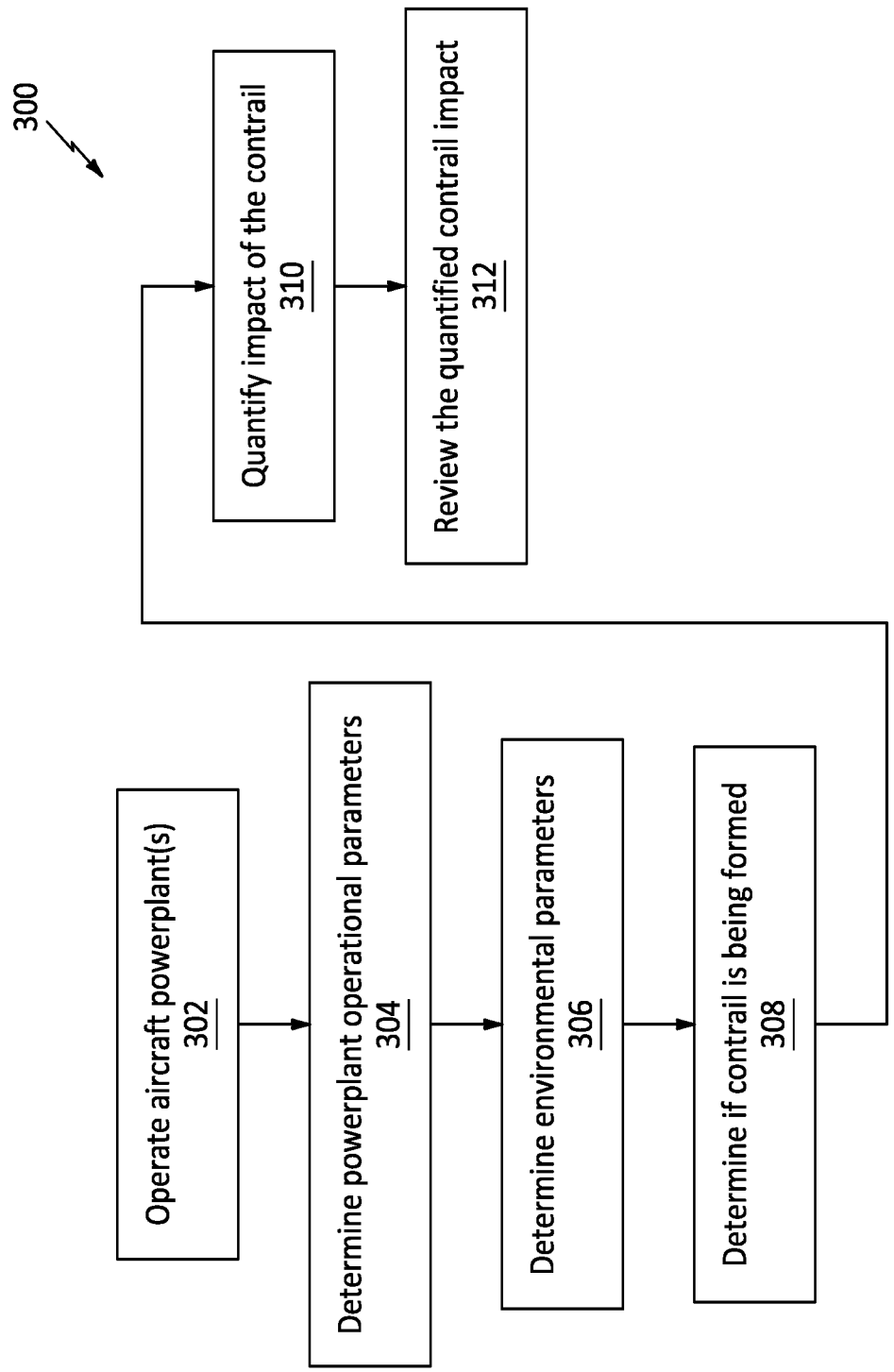
FIG. 3 is a flow diagram of a method for operating the aircraft using the aircraft system.

FIG. 3 is a flow diagram of a method 300 for operating an aircraft with an aircraft system. For ease of description, the method 300 is described herein with respect to the aircraft system 20 of FIG. 1. The method 300 of the present disclosure, however, is not limited to such an exemplary aircraft system.

In step 302, each aircraft powerplant 22 is operated to provide the aircraft with forward thrust. This aircraft powerplant operation exhausts combustion products into the outside environment. Water vapor within the exhausted combustion products may condense forming an aircraft contrail within the outside environment aft of the aircraft and its aircraft powerplants 22 under certain environmental conditions.

In step 304, one or more of the powerplant operational parameters are determined. The powerplant sensor system 26, for example, may measure and/or calculate the powerplant operational parameters and communicate these powerplant operational parameters to the monitoring system 30 via the powerplant data.

In step 306, one or more of the environmental parameters are determined. The environment sensor system 28, for example, may measure and/or calculate the environmental parameters and communicate these environmental parameters to the monitoring system 30 via the environment data.

In step 308, the monitoring system 30 determines whether or not an aircraft contrail is being formed; e.g., associated with each aircraft powerplant 22. The monitoring system 30, for example, may process one or more of the (e.g., real time) powerplant operational parameters and one or more of the (e.g., real time) environmental parameters with known meteorological forecasting (e.g., cloud formation, contrail formation, etc.) algorithms to determine if the combustion products being exhausted from each heat engine 34 are forming a persistent aircraft contrail. Examples of the powerplant operational parameters may include, but are not limited to, exhaust temperature, fuel flow, exhaust mass flow, and non-volatile particulate matter emissions. Examples of the environmental parameters may include, but are not limited to, ambient temperature, pressure, humidity, wind speed and wind direction. Examples of the meteorological forecasting algorithms may include, but are not limited to, the Global Forecast System (GFS) and the European Center for Medium Range Forecasting (ECMWF).

The determination of whether or not the aircraft contrail is forming may be performed in real time. Therefore, the monitoring system 30 need not seek to determine whether or not an aircraft contrail will form along a future portion of the aircraft flight path, but rather determine if the aircraft contrail is forming along a current portion of the flight path; e.g., just aft of the aircraft and its respective heat engine 34. This approach may facilitate a simple approach for determination of a majority of aircraft contrails.

If it is determined that no aircraft contrail is forming, then the method steps 304, 306 and 308 may be repeated to continue to monitor for potential aircraft contrail formation. If it is determined that an aircraft contrail is forming, then the method 300 continues onto the step 310 below.

In step 310, the monitoring system 30 quantifies an (e.g., instantaneous) environmental impact of each aircraft contrail. The monitoring system 30, for example, may process one or more of the (e.g., real time) powerplant operational parameters and one or more of the (e.g., real time) environmental parameters to determine one or more of the aircraft contrail parameters. Examples of the powerplant operational parameters and the environmental parameters include, but are not limited to, those examples described with respect to the step 308 above. Examples of the aircraft contrail parameters may include, but are not limited to: persistence of the aircraft contrail (e.g., a duration of how long the aircraft contrail lasts following dissipation, dispersion and sedimentation); optical thickness of the aircraft contrail (e.g., transparency of the aircraft contrail to radiation); localized balance of outgoing and incoming radiation (e.g., day versus night, above or below cloud cover, etc.); and/or aircraft contrail coverage area (e.g., combustion products plume size).

As an example, an aircraft contrail optical property model may be used to determine an overall climate warming characteristic of the aircraft contrail. This model may discretize the aircraft contrail into distance blocks for individual analysis as the aircraft flies. A sampling rate may depend upon a computational time required for the modeling. The model may be a parameterization of the aircraft contrail properties. Alternatively, the model may include microphysical modeling such as ice crystal size distribution and number density, plume size, dissipation, dispersion, sedimentation and/or optical thickness. The model may integrate a net effect of the aircraft contrail on local incoming versus outgoing radiation over a determined lifetime of the aircraft contrail. The system data inputs may be recorded over a duration of a mission with altitude, position and time stamps such that the data inputs may be available for instantaneous flight conditions over a previously completed flight trajectory. The data (e.g., the powerplant operational parameters, the environmental parameters, etc.) input into the model may be first passed through a smoothing filter (e.g., a moving average filter) aligned to the sampling rate of the monitoring system 30 to mitigate irregularities.

Examples of the contrail optical property model include, but are not limited to, CoCIP from German Aerospace Centre and CERM from Massachusetts Institute of Technology (MIT). The contrail optical property model may describe a life cycle of each contrail individually using a plume model with simple bulk contrail ice properties. Contrails are initiated when a Schmidt-Appleman criterion is satisfied and when the ambient atmosphere is humid enough to allow for contrail persistence. The initial plume properties are typically based on a total ice crystal number. An evolution of individual contrails for a cruising aircraft is computed using wind, temperature, humidity and ice water content. The plume trajectory follows horizontal and vertical wind combined with the aircraft wake. The model may simulate shear and turbulence driven plume spreading, ice water content as a function of ambient ice supersaturation (e.g., assuming ice saturation inside the contrail), and/or one or more ice particle loss processes (e.g., turbulent mixing, aggregation and sedimentation). Radiative cloud forcing may be estimated from the contrail properties using, for example, exogenously defined radiative fluxes.

In step 312, the quantified impact of the aircraft contrail is reviewed. Where it is determined the impact of the aircraft contrail is low, the method may repeat the steps 304, 306, 308 and 310 to continue to monitor for aircraft contrail formation and/or effects of the formed aircraft contrail. However, where it is determined the impact of the aircraft contrail is high, the monitoring system 30 may perform an action. The monitoring system 30, for example, may send a notification signal to the user interface 32 to notify the personnel operating the aircraft and its aircraft powerplants 22 of the forming aircraft contrail and/or its high environmental impact. The personnel may then take appropriate action as needed/desired/appropriate to mitigate further aircraft contrail formation. The aircraft flight path, for example, may be adjusted to a different altitude. A contrail suppression system may also or alternatively be activated.

The impact of the detected contrail may be assessed using a pre-calculated scale of contrail climate warming severity. The contrail climate warming severity scale may be defined exogenously and programmed into the monitoring system 30. Fleet-wide contrail impact analyses may be used to initially create a scale of contrail climate warming severity per unit distance of per unit of fuel burn. The monitoring system 30 may record a severity of contrails computed in flight and a database of these records (e.g., stripped of identifying factors) may be assembled. Over time, this database of actual recordings may replace (or supplement) the initial scale.

The monitoring system 30 may determine the aircraft contrail is a low impact contrail where, for example, one or more of its contrail parameters are below corresponding (e.g., predetermined) thresholds. By contrast, the monitoring system 30 may determine the aircraft contrail is a high impact contrail where, for example, one or more of its contrail parameters are equal to or above the thresholds. However, even where a high impact contrail is predicted, the monitoring system 30 may wait to perform its action until it is determined that the high impact contrail will have a long duration; e.g., time, distance, area, etc. For example, the monitoring system 30 may send the notification signal to the user interface 32 when multiple sequential distance blocks are determined to cause high severity contrails.

The thresholds for the high impact contrail and recommending action to aircraft operators may be an exogenous parameter defined by each operator. These thresholds may be subject to operator preferences and/or regulatory requirements. Where a high impact contrail is detected to be forming for longer than a minimum duration (e.g., over/across multiple sequential distance blocks), the operator may be notified and a mitigation action may be taken.

Uncertainty in contrail formation, persistence and various other properties may make it difficult to provide a net reduction in climate warming for every single contrail mitigation action. The aircraft system 20 of the present disclosure may therefore be configured for reducing net climate warming on a global basis. The aircraft system 20 may therefore be configured to deliver a reduction in expected value of contrail climate warming when evaluated over many aircraft operations. Performance may improve over time as data collection from use facilitates improved underlying analytical methods.

In some embodiments, each of the various powerplant operational parameters and/or environmental parameters utilized by the monitoring system 30 may be measured and/or otherwise determined by the aircraft system 20. However, in other embodiments, one or more of these parameters may alternatively be genericized, provided through forecasts and/or received from other nearby aircraft/aircraft that recently flew through a certain geographical area.

The monitoring system 30 may deliver a reduction in an expected value of contrail related climate warming when evaluated over multiple aircraft flights. Performance of the monitoring system 30 may improve over time as data collection from its use may facilitate adapted underlying analytic methods. The monitoring system 30 may also facilitate provision of a targeted contrail mitigation program that both determines whether an aircraft contrail is being formed and an environmental effect of the forming contrail. As described above, the monitoring system 30 may use real time onboard determined atmospheric, engine and optical system data with its contrail modeling algorithms to provide, for example, a more accurate analysis.

The systems and the methods of the present disclosure may use aircraft specific data to reduce error in contrail formation calculations and/or radiative forcing calculations. The systems and the methods may also or alternatively incorporate optical depth measurements of cloud cover above and/or below the aircraft to more accurately capture an incremental effect of a contrail based on a balance of incoming and outgoing radiation. The systems and the methods may also or alternatively use the onboard contrail radiative forcing calculation in its contrail mitigation system to indicate the need for a mitigation action to the aircraft operator.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
an aircraft powerplant comprising a heat engine configured to combust fuel within a combustion zone and exhaust combustion products of combusted fuel into an environment;
a powerplant sensor system including at least one powerplant sensor configured to provide engine data indicative of one or more operating parameters of the heat engine, and the one or more operating parameters comprises an exhaust mass flow of the heat engine;
an environment sensor system including at least one environmental sensor configured to provide environment data indicative of one or more environmental parameters of the environment in which the heat engine is operating; and
a monitoring system including at least one processing device and a memory, the monitoring system in signal communication with the powerplant sensor system and the environmental sensor system, the monitoring system configured to determine formation of a contrail based on the combustion products exhausted into the environment, the monitoring system configured to quantify an impact of the contrail when formed based on the engine data and the environment data;
wherein the monitoring system is further configured to initiate a response when the impact of the contrail is greater than a threshold for greater than a predetermined duration, the response comprising an action to mitigate formation of the contrail; and
wherein the response includes using a contrail suppression system to remove water vapor from the combustion products prior to exhausting the combustion products.

2. The system of claim 1, wherein the monitoring system is configured to determine the formation of the contrail and/or quantify the impact of the contrail when formed further based on a chemical property of fuel provided to the heat engine.

3. The system of claim 1, wherein the monitoring system is configured to quantify the impact of the contrail based on predicted persistence of the contrail within the environment.

4. The system of claim 1, wherein the one or more operating parameters further comprise an exhaust temperature of the heat engine.

5. The system of claim 1, wherein the one or more operating parameters further comprise a fuel flow rate to one or more injectors of the heat engine.

6. The system of claim 1, wherein the one or more operating parameters further comprise non-volatile particulate matter emissions from the heat engine.

7. The system of claim 1, wherein
the one or more environmental parameters comprise radiation within the environment, and
the monitoring system is configured to quantify the impact of the contrail when formed based on an effect of the contrail on the radiation within the environment.

8. The system of claim 7, wherein the radiation within the environment comprises at least one of
radiation traveling within the environment towards earth; or
radiation traveling within the environment away from earth.

9. The system of claim 7, wherein the one or more environmental parameters further comprise at least one of
an optical depth of cloud cover below the aircraft powerplant; or
an optical depth of cloud cover above the aircraft powerplant.

10. The system of claim 9, wherein the monitoring system is configured to determine radiative forcing associated with the contrail based on the optical depth of the cloud cover below the aircraft powerplant and the optical depth of the cloud cover above the aircraft powerplant.

11. The system of claim 7, wherein the environment sensor system comprises an optical sensor configured to measure at least one of
an intensity of radiation within the environment; or
a wavelength distribution of the radiation within the environment.

12. The system of claim 7, wherein
the environment sensor system comprises a plurality of optical sensors;
a first of the plurality of optical sensors is facing upwards; and
a second of the plurality of optical sensors is facing downwards.

13. The system of claim 1, wherein the monitoring system is configured to
discretize the contrail into a plurality of sections; and
quantify a net impact over a determined lifetime of a first of the plurality of sections of the contrail based on the engine data and the environment data.

14. The system of claim 13, further comprising a user interface configured to provide a notification to an operator of the aircraft powerplant when a sequential set of the plurality of sections of the contrail are quantified to have more than a threshold impact.

15. The system of claim 1, wherein the one or more environmental parameters comprise at least one of
ambient temperature within the environment;
ambient pressure within the environment;
humidity within the environment;
wind speed within the environment;
wind direction within the environment;
intensity of radiation within the environment; or
a wavelength distribution of the radiation within the environment.

16. The system of claim 1, wherein the heat engine comprises a gas turbine engine.

17. A system for an aircraft, comprising:
an aircraft powerplant comprising a heat engine configured to combust a mixture of fuel and air within a combustion chamber and exhaust combustion products of the mixture into an environment;
a monitoring system in communication with a plurality of optical sensors, the monitoring system configured to predict formation of a contrail in the environment based on the combustion products, the monitoring system configured to quantify an impact of the contrail based on real-time operating parameters of the heat engine and real-time environmental parameters of the environment, the real-time environmental parameters comprising radiation within the environment;
a first of the plurality of optical sensors is facing upwards on the aircraft;
a second of the plurality of optical sensors is facing downwards on the aircraft; and
a user interface configured to receive a notification signal from the monitoring system and notify an operator of the aircraft powerplant to adjust an aircraft flight path when the quantified impact of the contrail is greater than a threshold for at least a predetermined duration;
wherein the monitoring system is further configured to initiate a response when the impact of the contrail is greater than the threshold for greater than the predetermined duration, the response comprising an action to mitigate formation of the contrail; and
wherein the response includes using a contrail suppression system to remove water vapor from the combustion products prior to exhausting the combustion products.

18. A method for operating an aircraft, comprising:
combusting fuel within a combustion zone of a heat engine and subsequently exhausting combustion products generated by the combusting of the fuel into an environment through which the aircraft is flying;
providing engine data indicative of one or more operating parameters of a heat engine, the engine data provided by at least one powerplant sensor in signal communication with the heat engine;
providing environment data indicative of one or more environmental parameters of an environment through which the aircraft is flying, the environmental data provided by a plurality of environmental sensors, and the one or more environmental parameters comprise radiation within the environment, the one or more environmental parameters further comprising at least one of: an optical depth of cloud cover below the heat engine, or an optical depth of cloud cover above the heat engine;
determining formation of a contrail based on the combustion products exhausted into the environment and quantifying an impact of the contrail based on the engine data and an effect of the contrail on the radiation within the environment;
sending a notification signal to notify an operator of the aircraft when the quantified impact of the contrail is greater than a threshold for at least a predetermined duration; and adjusting an aircraft flight path in response to the notification signal to mitigate formation of the contrail.

\* \* \* \* \*